(12) United States Patent
Toukoniitty et al.

(10) Patent No.: US 11,981,869 B2
(45) Date of Patent: May 14, 2024

(54) PURIFICATION OF RECYCLED AND RENEWABLE ORGANIC MATERIAL

(71) Applicant: Neste Oyj, Espoo (FI)

(72) Inventors: Blanka Toukoniitty, Porvoo (FI); Ville Paasikallio, Porvoo (FI); Jukka-Pekka Pasanen, Porvoo (FI); Jouni Touronen, Porvoo (FI); Meri Hovi, Porvoo (FI); Antti Pasanen, Porvoo (FI); Salla Likander, Porvoo (FI); Sami Toppinen, Porvoo (FI); Pekka Aalto, Porvoo (FI); Kari Jansson, Porvoo (FI); Marina Lindblad, Porvoo (FI); Mats Käldström, Porvoo (FI); Kaisa Lamminpää, Porvoo (FI); Andrea Perez Nebreda, Porvoo (FI)

(73) Assignee: NESTE OYJ, Espoo (FI)

( * ) Notice: Subject to any disclaimer, the term of this patent is extended or adjusted under 35 U.S.C. 154(b) by 231 days.

(21) Appl. No.: 17/261,781

(22) PCT Filed: Jul. 19, 2019

(86) PCT No.: PCT/EP2019/069474
§ 371 (c)(1),
(2) Date: Jan. 20, 2021

(87) PCT Pub. No.: WO2020/016400
PCT Pub. Date: Jan. 23, 2020

(65) Prior Publication Data
US 2021/0292657 A1    Sep. 23, 2021

(30) Foreign Application Priority Data

Jul. 20, 2018 (FI) ...................... 20185650

(51) Int. Cl.
| C10G 9/36 | (2006.01) |
| C10G 3/00 | (2006.01) |
| C10G 11/18 | (2006.01) |
| C10G 31/06 | (2006.01) |
| C10G 45/12 | (2006.01) |
| C10G 45/64 | (2006.01) |

(52) U.S. Cl.
CPC ............ *C10G 3/50* (2013.01); *C10G 3/49* (2013.01); *C10G 9/36* (2013.01); *C10G 11/18* (2013.01); *C10G 45/12* (2013.01); *C10G 45/64* (2013.01); *C10G 2300/1007* (2013.01); *C10G 2300/1011* (2013.01); *C10G 2300/202* (2013.01)

(58) Field of Classification Search
CPC ... C10G 3/49; C10G 3/50; C10G 9/36; C10G 45/12; C10G 45/64; C10G 31/06; C10G 2300/202; C10G 2300/1007; C10G 2300/1014; C10G 2300/1018
See application file for complete search history.

(56) References Cited

U.S. PATENT DOCUMENTS

| 2,524,088 A | 10/1950 | Shaw |
| 3,503,866 A | 3/1970 | Skripek et al. |
| 4,097,369 A | 6/1978 | Ebel et al. |
| 4,151,072 A | 4/1979 | Johnson et al. |
| 4,160,725 A | 7/1979 | Josis et al. |
| 4,241,227 A | 12/1980 | Stonner et al. |
| 4,252,637 A | 2/1981 | Knorre et al. |
| 4,328,128 A | 5/1982 | Stanulonis et al. |
| 4,400,553 A | 8/1983 | Aneja |
| 5,049,258 A | 9/1991 | Keim et al. |
| 5,449,797 A | 9/1995 | Estes et al. |
| 5,514,632 A | 5/1996 | Chester et al. |
| 6,072,065 A | 6/2000 | Chavet |
| 6,586,638 B1 | 7/2003 | Zhang et al. |
| 8,742,185 B2 | 6/2014 | Ouni et al. |
| 9,347,178 B2 | 5/2016 | Powell et al. |
| 9,353,478 B2 | 5/2016 | Powell et al. |
| 9,382,483 B2 | 7/2016 | Knuuttila et al. |
| 9,399,836 B2 | 7/2016 | Powell et al. |
| 9,441,176 B2 | 9/2016 | Moniotte et al. |
| 9,593,448 B2 | 3/2017 | Powell et al. |

(Continued)

FOREIGN PATENT DOCUMENTS

| CA | 894222 A | 2/1972 |
| CA | 3035629 A1 | 4/2018 |

(Continued)

OTHER PUBLICATIONS

Energy Fossil, Recovery of Navy Distillate Fuel from Reclaimed Product, Dennis W. Brinkman & Marwin L. Whisman (Published Nov. 1984).
Fats and Oils: Formulating and Processing for Applications, Third Edition By Richard D. O'Brien (2009).
Finnish Office Action dated Aug. 23, 2019 for Application No. 2185650.
International Preliminary Report on Patentability issued in corresponding International Patent Application No. PCT/EP2019/069474 dated Dec. 15, 2020.
International Preliminary Report on Patentability issued in corresponding International Patent Application No. PCT/EP2019/069482 dated Jan. 21, 2021.

(Continued)

*Primary Examiner* — Randy Boyer
(74) *Attorney, Agent, or Firm* — BUCHANAN INGERSOLL & ROONEY PC

(57) ABSTRACT

A method is disclosed of purifying a recycled or renewable organic material, wherein the recycled or renewable organic material contains one or more impurities selected from a group consisting of silicon compounds, phosphorous, Cl and sterols. Exemplary embodiments include (a) providing the recycled or renewable organic material; (c) heat treating the recycled or renewable organic material at 100 to 450° C.; and (f) hydrotreating the heat treated recycled or renewable organic material in a presence of a hydrotreating catalyst; to obtain purified hydrotreated recycled or renewable organic material.

39 Claims, 4 Drawing Sheets

(56) References Cited

U.S. PATENT DOCUMENTS

| | | | |
|---|---|---|---|
| 9,663,720 | B2 | 5/2017 | Nousiainen et al. |
| 9,688,919 | B2 | 6/2017 | Vilonen et al. |
| 9,932,530 | B2 | 4/2018 | Garg et al. |
| 10,023,810 | B2 | 7/2018 | Nousiainen et al. |
| 10,815,428 | B2 | 10/2020 | Nousiainen et al. |
| 2005/0101761 | A1 | 5/2005 | Lambert et al. |
| 2005/0240065 | A1 | 10/2005 | Blaschke et al. |
| 2006/0167291 | A1 | 7/2006 | Te et al. |
| 2007/0170091 | A1 | 7/2007 | Monnier et al. |
| 2008/0314799 | A1 | 12/2008 | Li et al. |
| 2009/0229172 | A1 | 9/2009 | Brady et al. |
| 2009/0250376 | A1 | 10/2009 | Brandvold et al. |
| 2011/0138680 | A1* | 6/2011 | Dandeu ............... C10G 3/50 44/307 |
| 2012/0088943 | A1* | 4/2012 | Knuuttila ............. C10G 3/46 422/187 |
| 2012/0116134 | A1 | 5/2012 | Bozzano et al. |
| 2013/0072730 | A1 | 3/2013 | Knuuttila et al. |
| 2013/0090502 | A1 | 4/2013 | Laakkonen et al. |
| 2013/0158329 | A1 | 6/2013 | Brandvold |
| 2013/0232857 | A1 | 9/2013 | Moniotte et al. |
| 2013/0305598 | A1 | 11/2013 | Hamilton et al. |
| 2013/0345487 | A1 | 12/2013 | Baird et al. |
| 2014/0005451 | A1 | 1/2014 | Mezza et al. |
| 2014/0013658 | A1 | 1/2014 | Silverman et al. |
| 2014/0213836 | A1 | 7/2014 | Yao et al. |
| 2014/0275666 | A1 | 9/2014 | Bauer et al. |
| 2015/0052807 | A1 | 2/2015 | Nousiainen et al. |
| 2015/0059354 | A1 | 3/2015 | Gutierrez et al. |
| 2015/0251168 | A1 | 9/2015 | Kettunen et al. |
| 2015/0361356 | A1 | 12/2015 | Garg et al. |
| 2015/0376514 | A1 | 12/2015 | Yao et al. |
| 2016/0060540 | A1 | 3/2016 | Ouni et al. |
| 2016/0130509 | A1* | 5/2016 | Nousiainen ........... C10G 45/60 585/324 |
| 2016/0177188 | A1 | 6/2016 | Vilonen et al. |
| 2016/0177201 | A1 | 6/2016 | Pandranki et al. |
| 2016/0186067 | A1 | 6/2016 | Powell et al. |
| 2016/0257888 | A1 | 9/2016 | Nousiainen et al. |
| 2016/0289576 | A1 | 10/2016 | Eilos |
| 2017/0145318 | A1 | 5/2017 | Myllyoja et al. |
| 2017/0158967 | A1 | 6/2017 | Reiner et al. |
| 2019/0203154 | A1 | 7/2019 | Malm |
| 2020/0308505 | A1 | 10/2020 | Dayton et al. |
| 2021/0269722 | A1 | 9/2021 | Touronen et al. |
| 2021/0277324 | A1 | 9/2021 | Toukoniitty et al. |
| 2021/0284925 | A1 | 9/2021 | Gao et al. |
| 2021/0292653 | A1 | 9/2021 | Touronen et al. |
| 2021/0292656 | A1 | 9/2021 | Touronen et al. |
| 2021/0301210 | A1 | 9/2021 | Timken et al. |
| 2021/0332300 | A1 | 10/2021 | Timken |
| 2022/0135891 | A1 | 5/2022 | Toukoniitty et al. |

FOREIGN PATENT DOCUMENTS

| | | |
|---|---|---|
| CN | 102102048 A | 6/2011 |
| CN | 102504866 A | 6/2012 |
| CN | 102786986 A | 11/2012 |
| CN | 106552611 A | 4/2017 |
| CN | 107636124 A | 1/2018 |
| CN | 107892990 A | 4/2018 |
| CN | 107974265 A | 5/2018 |
| CN | 107974266 A | 5/2018 |
| CN | 108251156 A | 7/2018 |
| EP | 0072873 A1 | 3/1983 |
| EP | 0420651 A1 | 4/1991 |
| EP | 0420652 A1 | 4/1991 |
| EP | 0574272 A2 | 12/1993 |
| EP | 1396531 A2 | 3/2004 |
| EP | 2149593 A1 | 2/2010 |
| EP | 2930231 A1 | 10/2015 |
| FI | 20135638 A | 12/2014 |
| JP | H0940970 A | 2/1997 |
| JP | H1161148 A | 3/1999 |
| JP | 2000169862 A | 6/2000 |
| JP | 2003034794 A | 2/2003 |
| JP | 2003253038 A | 9/2003 |
| JP | 2007224196 A | 9/2007 |
| JP | 2009155475 A | 7/2009 |
| JP | 2010509472 A | 3/2010 |
| JP | 2011515539 A | 5/2011 |
| JP | 2013544304 A | 12/2013 |
| SE | 352373 B | 12/1972 |
| WO | 2008058664 A1 | 5/2008 |
| WO | 2012069467 A1 | 5/2012 |
| WO | 2013089838 A1 | 6/2013 |
| WO | 2013156683 A1 | 10/2013 |
| WO | 2014001633 A1 | 1/2014 |
| WO | 2015087938 A1 | 6/2015 |
| WO | 2015101713 A1 | 7/2015 |
| WO | 2016053948 A1 | 4/2016 |
| WO | 2018024728 A1 | 2/2018 |
| WO | 2018025103 A1 | 2/2018 |
| WO | 2018025104 A1 | 2/2018 |
| WO | 2018058172 A1 | 4/2018 |
| WO | 2018127812 A1 | 7/2018 |

OTHER PUBLICATIONS

International Preliminary Report on Patentability issued in corresponding International Patent Application No. PCT/EP2019/069490 dated Jul. 15, 2020.

International Preliminary Report on Patentability issued in corresponding International Patent Application No. PCT/EP2019/069497 dated Oct. 9, 2020.

International Preliminary Report on Patentability issued in corresponding International Patent Application No. PCT/EP2019/069503 dated Sep. 20, 2020.

International Preliminary Report on Patentability issued in corresponding International Patent Application No. PCT/EP2019/069512 dated Sep. 20, 2020.

International Search Report (PCT/ISA/210) and Written Opinion (PCT/ISA/237) dated Dec. 19, 2019, by the European Patent Office as the International Searching Authority for International Application No. PCT/EP2019/069503.

International Search Report (PCT/ISA/210) and Written Opinion (PCT/ISA/237) dated Dec. 5, 2019, by the European Patent Office as the International Searching Authority for International Application No. PCT/EP2019/069474.

International Search Report (PCT/ISA/210) and Written Opinion (PCT/ISA/237) dated Nov. 12, 2019, by the European Patent Office as the International Search Authority for International Patent Application No. PCT/EP2019/069482.

International Search Report (PCT/ISA/210) and Written Opinion (PCT/ISA/237) dated Sep. 10, 2019, by the European Patent Office as the International Searching Authority for International Application No. PCT/EP2019/069497.

International Search Report (PCT/ISA/210) and Written Opinion (PCT/ISA/237) dated Sep. 10, 2019, by the European Patent Office as the International Searching Authority for International Application No. PCT/EP2019/069512.

International Search Report (PCT/ISA/210) with translation and Written Opinion (PCT/ISA/237) dated Nov. 12, 2019, by the European Patent Office as the International Searching Authority for International Application No. PCT/EP2019/069490.

Punkkinen Henna et al., Research Report: "Thermal conversion of plastic-containing waste: A Review" (2017).

Search Report dated Apr. 9, 2019 by the Finnish Patent and Registration Office for Application No. 20185651.

Search Report dated Nov. 12, 2018 by the Finnish Patent and Registration Office for Application No. 20185651.

Search Report dated Nov. 19, 2018 by the Finnish Patent and Registration Office for Application No. 20185653.

Search Report dated Nov. 20, 2018 by the Finnish Patent and Registration Office for Application No. 20185654.

Search Report dated Nov. 21, 2018 by the Finnish Patent and Registration Office for Application No. 20185655.

(56) References Cited

OTHER PUBLICATIONS

Search Report dated Nov. 21, 2018 by the Finnish Patent and Registration Office for Application No. 2185650.
Search Report dated Nov. 6, 2018 by the Finnish Patent and Registration Office for Application No. 20185652.
Mohd Zin, Rohani Binti, et al., "Process Design in Degumming and Bleaching of Palm Oil", Centre of Lipids Engineering and Applied Research (CLEAR), Universiti Teknologi Malaysia, Nov. 2006, 239 pages.
Pyl, Steven P., et al., "Wood-derived olefins by steam cracking of hydrodeoxygenated tall oils", Bioresource Technology 126, 2012, pp. 48-55, Elsevier Ltd.
Sigot, L., et al., "Adsorption of octamethylcyclotetrasiloxane on silica gel for biogas purification", Fuel, Jul. 8, 2014, vol. 135, pp. 205-209.
Vogt, E.T.C., et al., "Fluid catalytic cracking: recent developments on the grand old lady of zeolite catalysis", Chem. Soc. Rev., Sep. 18, 2015, pp. 7342-7370, The Royal Society of Chemistry.
Office Action dated Nov. 10, 2022, by the U.S. Patent and Trademark Office in U.S. Appl. No. 17/261,754.
Office Action dated Sep. 15, 2022, 2022, by the U.S. Patent and Trademark Office in U.S. Appl. No. 17/261,736.
First Office Action dated Feb. 15, 2022, issued in the corresponding Chinese Patent Application No. 2019800477596, 15 pages including 6 pages of English Translation.
Office Action dated Mar. 1, 2022, issued in the corresponding Japanese Patent Application No. 2021-502416, 4 pages including 2 pages of English Translation.
Office Action dated Mar. 1, 2022, issued in the corresponding Japanese Patent Application No. 2021-502417, 10 pages including 6 pages of English Translation.
Office Action dated Mar. 1, 2022, issued in the corresponding Japanese Patent Application No. 2021-502426, 5 pages including 3 pages of English Translation.
Office Action dated Mar. 8, 2022, issued in the corresponding Japanese Patent Application No. 2021-502928, 8 pages including 5 pages of English Translation.
Office Action (Communication) dated Mar. 30, 2022, by the European Patent Office in corresponding European Patent Application No. 19742575.4. (8 pages).
Office Action dated Mar. 17, 2022, by the U.S. Patent Office in corresponding U.S. Appl. No. 17/261,679.
First Office Action dated Feb. 15, 2022, by the Chinese Patent Office in corresponding Chinese Patent Application No. 2019800484072, and an English Translation of the Office Action. (18 pages).
Notification of the First Office Action dated Apr. 25, 2023, by the Chinese Patent Office in corresponding Chinese Patent Application No. 201980053799.1, and an English Translation of the Office Action. (21 pages).
English Translation of the Search Report dated Mar. 24, 2022, issued in the corresponding Chinese Application No. 2019800538354. (4 pages).
Office Action issued on Feb. 20, 2024, by the U.S. Patent and Trademark Office in U.S. Appl. No. 17/261,754.

* cited by examiner

Figure 1

PURIFICATION OF RECYCLED AND RENEWABLE ORGANIC MATERIAL

FIELD OF THE INVENTION

The present invention relates to a method of purifying recycled or renewable organic material, in particular recycled or renewable organic material comprising one or more impurities selected from a group consisting of silicon compounds, phosphorous compounds, chlorine compounds and metals.

BACKGROUND OF THE INVENTION

In some cases recycled or renewable organic material contains high amounts of silicon (Si) as silicon compounds and high amounts of phosphorous as phosphorous compounds such as phospholipids. Before catalytic processing of the recycled or renewable organic material these impurities need to be removed from the material as these compounds are known catalyst poisons and should therefore be removed prior to hydrotreating to maximize the cycle length and profits of the hydrotreater.

BRIEF DESCRIPTION OF THE INVENTION

An object of the present invention is thus to provide a method so as to overcome the above problems. The objects of the invention are achieved by a method which is characterized by what is stated in the independent claims. The preferred embodiments of the invention are disclosed in the dependent claims.

The invention is based on the surprising realization recycled or renewable organic material containing high amounts of phosphorous and silicon compounds may be purified by a method that leads to removal of phosphorous and silicon compounds from the recycled or renewable organic material as the recycled or renewable organic material is subjected to heat treating the recycled or renewable organic material at 100 to 450° C. and filtering the material and hydrotreating the heat treated recycled or renewable organic material in a presence of a hydrotreating catalyst.

BRIEF DESCRIPTION OF THE DRAWINGS

In the following the invention will be described in greater detail by means of preferred embodiments with reference to the attached drawings, in which FIG. 1 illustrates a first exemplary process flow of the present method.

DETAILED DESCRIPTION OF THE INVENTION

Figure 2:
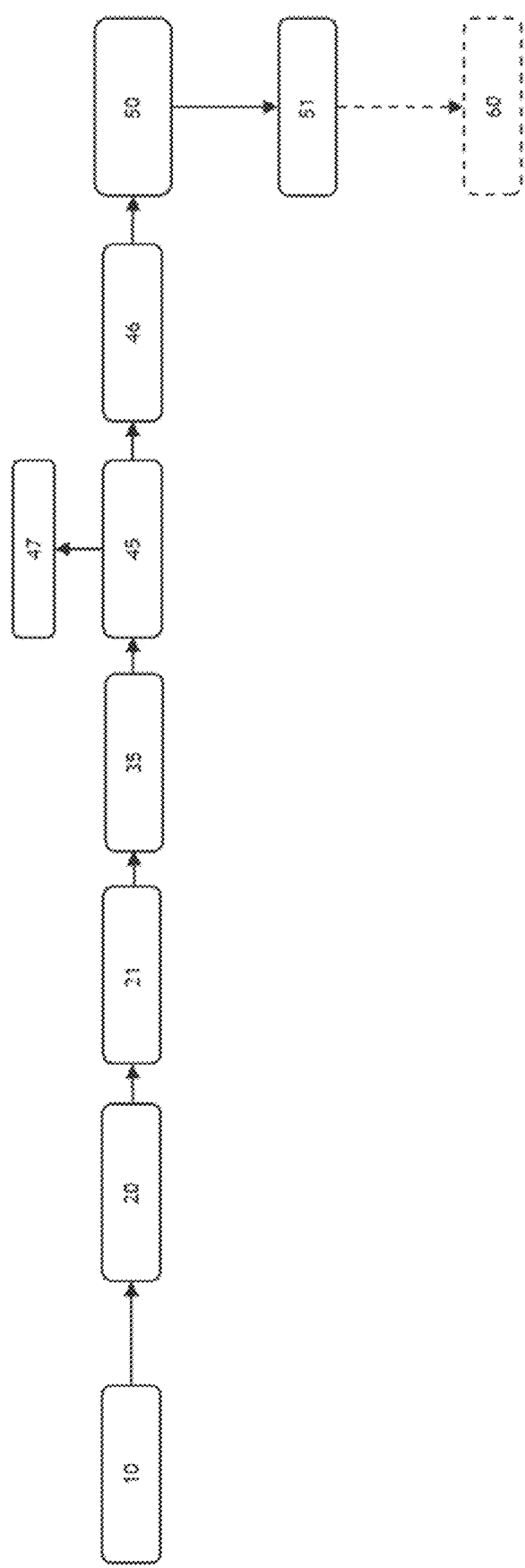
FIG. 2 illustrates a second exemplary process flow of the present method.

The present invention provides a method of purifying a recycled or renewable organic material.

The term "recycled or renewable organic material" refers to organic material, i.e. material containing carbon, obtained 1) from a natural resource which replenishes to overcome recourse depletion caused by its usage and consumption or 2) from a raw or processed material that is recovered from a waste for reuse. The recycled or renewable organic material characteristically comprises aliphatic compounds having a carbon chain of from 4 to 30 carbon atoms, particularly from 12 to 22 carbon atoms. Typical examples of such aliphatic compounds are fatty acids or esters thereof, in particular wherein the fatty acids have an aliphatic chain of from 4 to 30 carbon atoms, more particularly from 12 to 22 carbon atoms. The recycled or renewable organic material typically comprises at least 50 wt % aliphatic compounds of the total weight of the recycled or renewable organic material.

Typically the recycled or renewable organic material refers to fats and/or oils of plant, microbial, algal and/or animal origin. It also refers to any waste stream received from processing of such oils and/or fats. The recycled or renewable organic material may be in an unprocessed form (e.g. animal fat), or a processed form (used cooking oil). The recycled or renewable organic material also refers to fossil waste-based oils and waste oils.

The term "plant based fats and oils" refers to fat and/or oils of plant origin i.e. oils that can originate directly from plants or can be byproducts from various industrial sectors, such as agriculture or forest industry.

Examples of plant based fats and oils of the present invention include, but are not limited to, sludge palm oil, rapeseed oil, canola oil, colza oil, sunflower oil, soybean oil, hemp oil, olive oil, linseed oil, cottonseed oil, mustard oil, palm oil, arachis oil, castor oil and coconut oil.

Other examples of plant based fats and oils include biocrudes and bio oils. Biocrudes and bio oils are produced from biomass, in particular from lignocellulosic biomass, with various liquefying methods, such as hydrothermal liquefaction, or pyrolysis, in particular fast pyrolysis.

The term "biocrude" refers to oils produced from biomass by employing hydrothermal liquefaction. The term "bio oil" refers to pyrolysis oils produced from biomass by employing pyrolysis. The term "biomass" refers to material derived from recently living organisms, which includes plants, animals and their byproducts. The term "lignocellulosic biomass" refers to biomass derived from plants or their byproducts. Lignocellulosic biomass is composed of carbohydrate polymers (cellulose, hemicellulose) and an aromatic polymer (lignin).

The term "pyrolysis" refers to thermal decomposition of materials at elevated temperatures in a non-oxidative atmosphere. The term "fast pyrolysis" refers to thermochemical decomposition of biomass through rapid heating in absence of oxygen. The term "hydrothermal liquefaction" (HTL) refers to a thermal depolymerization process used to convert wet biomass into crude-like oil under moderate temperature and high pressure.

Examples of bio oil and biocrude produced from lignocellulosic biomass, e.g. materials like forest harvesting residues or byproducts of a saw mill, are lignocellulosic pyrolysis liquid (LPL), produced by employing fast pyrolysis, and HTL-biocrude, produced by employing hydrothermal liquefaction.

Further examples of plant based fats and oils include crude tall oil (CTO), obtained as a by-product of the Kraft process (wood pulping), and its derivatives, such as tall oil pitch (TOP), crude fatty acid (CFA), tall oil fatty acid (TOFA) and distilled tall oil (DTO).

Crude tall oil comprises resin acids, fatty acids, and unsaponifiables. Resin acids are a mixture of organic acids derived from oxidation and polymerization reactions of terpenes. The main resin acid in crude tall oil is abietic acid but abietic derivatives and other acids, such as primaric acid are also found. Fatty acids are long chain monocarboxylic acids and are found in hardwoods and softwoods. The main fatty acids in crude tall oil are oleic, linoleic and palmitic acids. Unsaponifiables cannot be turned into soaps as they are neutral compounds which do not react with sodium hydroxide to form salts. They include sterols, higher alcohols and hydrocarbons. Sterols are steroids derivatives which also include a hydroxyl group.

The term "tall oil pitch (TOP)" refers to residual bottom fraction from crude tall oil (CTO) distillation processes. Tall oil pitch typically comprises from 34 to 51 wt % free acids, from 23 to 37 wt % esterified acids, and from 25 to 34 wt % unsaponifiable neutral compounds of the total weight of the tall oil pitch. The free acids are typically selected from a group consisting of dehydroabietic acid, abietic and other resin acids. The esterified acids are typically selected from a group consisting of oleic and linoleic acids. The unsaponifiables neutral compounds are typically selected from a group consisting of diterpene sterols, fatty alcohols, sterols, and dehydrated sterols.

The term "crude fatty acid (CFA)" refers to fatty acid-containing materials obtainable by purification (e.g., distillation under reduced pressure, extraction, and/or crystallization) of CTO.

The term "tall oil fatty acid (TOFA)" refers to fatty acid rich fraction of crude tall oil (CTO) distillation processes. TOFA typically comprises mainly fatty acids, typically at least 80 wt % of the total weight of the TOFA. Typically TOFA comprises less than 10 wt % rosin acids.

The term "distilled tall oil (DTO)" refers to resin acid rich fraction of crude tall oil (CTO) distillation processes. DTO typically comprises mainly fatty acids, typically from 55 to 90 wt %, and rosin acids, typically from 10 to 40 wt % rosin acids, of the total weight of the DTO. Typically DTO comprises less than 10 wt % unsaponifiable neutral compounds of the total weight of the distilled tall oil.

The term "animal based fats and oils" refers to fats and/or oils of animal origin i.e lipid materials derived from animals. Examples of animal based fats and oils include, but are not limited to, such as suet, tallow, blubber, lard, train oil, milk fat, fish oil, poultry oil and poultry fat.

The term "microbial oils" refers to triglycerides (lipids) produced by microbes.

The term "algal oils" refers to oils derived directly from algae.

The term "fossil waste-based oils" refers to oils produced from waste streams like waste plastics or end-life-tires. Examples of fossil waste-based oils include waste plastic pyrolysis oil (WPPO) and end-life-tire pyrolysis oil (ELTPO).

The term "waste oils" refers to any oils that, through contamination, have become unsuitable for their original purpose due to the presence of impurities or loss of original properties. Examples of waste oils are used lubricant oils (ULO), hydraulic oils, transformer oils or oils used in metal working.

In the present invention the recycled or renewable organic material is typically selected from a group consisting of plant based fats and oils, animal based fats and oils, fossil waste-based oils, waste oils, algal oils and microbial oils.

Particular examples of the recycled or renewable organic material of the present invention include, but are not limited to, animal based fats and oils, such as suet, tallow, blubber, lard, train oil, milk fat, fish oil, poultry oil, and poultry fat; plant based fats and oils, such as sludge palm oil, rapeseed oil, canola oil, colza oil, sunflower oil, soybean oil, hemp oil, olive oil, linseed oil, cottonseed oil, mustard oil, palm oil, arachis oil, castor oil, coconut oil, lignocellulosic pyrolysis liquid (LPL), HTL biocrude, crude tall oil (CTO), tall oil pitch (TOP), crude fatty acid (CFA), tall oil fatty acid (TOFA) and distilled tall oil (DTO); microbial oils; algal oils; recycled fats or various waste streams of the food industry, such as used cooking oil, yellow and brown greases; free fatty acids, any lipids containing phosphorous and/or metals, oils originating from yeast or mold products, recycled alimentary fats; starting materials produced by genetic engineering, and any mixtures of said feedstocks.

In an example is the present invention the recycled or renewable organic material is selected from a group consisting of tall oil derivates and pyrolysis oils; in particular from a group consisting of tall oil pitch (TOP),), hydrothermal liquefaction oil (HTL), lignocellulose pyrolysis oils, AF oil, used crude oil (UCO), used lubricating oil (ULO), waste plastic pyrolytic oil (WPPO), pyrolysis oil from end-of-life tyres (ELT), algae oils, and lignin oils; more particularly the recycled or renewable organic material is tall oil pitch (TOP).

In particular, the recycled or renewable organic material is tall oil pitch (TOP).

The recycled or renewable organic material to be treated by the present method contains high amounts of silicon compounds. The recycled or renewable organic material of the present invention comprises more than 1 ppm silicon compounds. In particular the recycled or renewable organic material of the present invention comprises more than 10 ppm silicon compounds, more particularly the recycled or renewable organic material of the present invention comprises more than 15 ppm silicon compounds, and even more particularly the recycled or renewable organic material of the present invention comprises more than 20 ppm silicon compounds.

The recycled or renewable organic material to be treated by the present method further contains high amounts of phosphorous compounds. The phosphorous compounds present in the biomass-based lipid material are typically phospholipids. The phospholipids present in the biomass-based lipid material are in particular one or more of phosphatidyl ethanolamines, phosphadityl cholines, phosphatidyl inositols, phosphatidic acids, and phosphatidyl ethanolamines.

In particular the recycled or renewable organic material of the present invention comprises from 1 to 1000 ppm phosphorous as phosphorous compounds.

The recycled or renewable organic material to be treated by the present method contains high amounts of chloride (Cl). Typically chloride is present in the form of chloride salts and/or organic chloride compounds, such as chlorinated hydrocarbons. The recycled or renewable organic material of the present invention comprises more than 20 ppm Cl, in particular more than 50 ppm Cl, more particularly from 50 to 1000 ppm Cl. Furthermore, the recycled or renewable organic material to be treated by the present method contains high amounts oxygen as organic oxygen compounds.

The recycled or renewable organic material to be treated by the present method may also comprise further impurities e.g. impurities comprising phosphorus and/or metals in the form of phospholipids, soaps and/or salts. The impurities may for example be in the form of phosphates or sulfates, iron salts or organic salts, soaps or phospholipids. The metal impurities that may be present in the biomass-based lipid material are for example alkali metals or alkali earth metals, such as sodium or potassium salts, or magnesium or calcium salts, or any compounds of said metals.

Accordingly provided herein is a method of purifying a recycled or renewable organic material, wherein the recycled or renewable organic material comprises one or more impurities selected from a group consisting of silicon compounds, phosphorous compounds, chlorine compounds, nitrogen compounds, sulfur compounds, and hydroxyaromatic compounds, comprising the steps of (a) providing the recycled or renewable organic material;

(b) optionally pre heat treating the recycled or renewable organic material at 180 to 325° C., and optionally adding acid before or after the pre heat treatment process, and optionally filtering the pre heat treated recycled or renewable organic material after the pre heat treatment;

(c) heat treating the recycled or renewable organic material at 150 to 450° C., optionally in the presence of an adsorbent, optionally adding water before or during the heat treatment process, and optionally adding acid before or after the heat treatment process, and optionally filtering the heat treated recycled or renewable organic material after the heat treatment;

(d) optionally evaporating volatile silicon compounds from the heat treated recycled or renewable organic material compounds thereby reducing the silicon content of the heat treated recycled or renewable organic material;

(e) optionally thermally cracking the recycled or renewable organic material thereby reducing the oxygen and phosphorous content of the heat treated recycled or renewable organic material and optionally removing volatiles from the thermally cracked recycled or renewable organic material, and optionally removing solids/precipitates from the recycled or renewable organic material; and (f) hydrotreating the heat treated recycled or renewable organic material in a presence of a hydrotreating catalyst;

to obtain purified hydrotreated recycled or renewable organic material.

Prior to heat treatment in step (c) the recycled or renewable organic material may be subjected to a pre heat treatment in absence of adsorbent material. In optional step (b) the recycled or renewable organic material is heated to cause thermal reactions that disrupt silicon containing impurities comprised in the recycled or renewable organic material creating volatile silicon compounds material that can be subsequently removed from the recycled or renewable organic material. In particular polydimethylsiloxanes (PDMS) resulting from antifouling agents degrade to volatile polydimethylcyclosiloxanes (PDMCS) under the process conditions.

The heat treatment of step (b) takes place at any temperature from 180 to 325° C. For achieving optimal results, step (b) is performed at 200 to 300° C., preferably at 240 to 280° C.

The time during which the recycled or renewable organic material is heated and held at the desired temperature, i.e. residence time, is typically from 1 to 300 min, preferably from 5 to 90 min, more preferably from 20 to 40 min in step (b).

The pressure in the heat treatment in step (b) is typically from 500 to 5000 kPa, preferably from 800 to 2000 kPa.

Optionally, the process can be further enhanced by acid addition before or after pre heat treatment in step (b). This removes any remaining sodium impurities. The acid is preferably selected from citric acid and phosphoric acid.

In step (b) the solid material created due to the heat treatment and/or adsorbent comprising undesired impurities may be removed. Removal of the solid material may be achieved for example by any separation method found suitable by a skilled person for separation of the solid material from the heat treated recycled or renewable organic material. Suitable examples include, but are not limited to, filtration, centrifugation and phase separation. It is also to be understood that several separation methods, e.g. filtration and centrifugation, may be combined. Preferably the removal is accomplished by filtration. The removal is preferably performed at any temperature from 100 to 180° C.

Removal or solids/precipitates avoids deactivation of the hydrotreating catalyst in hydrotreatment of the recycled or renewable organic material.

In step (c) the recycled or renewable organic material is heated at any temperature from 100 to 450° C. For achieving optimal results, step (c) is performed at from 180 to 325° C., preferably from 200 to 300° C., more preferably at from 240 to 280° C.

The time during which the recycled or renewable organic material is heated and held at the desired temperature, i.e. residence time, is typically from 1 to 300 min, preferably from 5 to 240 min, more preferably from 30 to 90 min in step (c).

The pressure in step (c) is typically from 500 to 5000 kPa, preferably from 800 to 2000 kPa.

In step (c) the recycled or renewable organic material is heated to cause thermal reactions that disrupt the structure of the impurity containing compounds comprised in the recycled or renewable organic material thus forming material that adsorbs into the adsorbent present in the heating step (c), or material that forms solid precipitates and that can thus be subsequently removed from the recycled or renewable organic material.

Adsorbent is optionally present in step (c). The adsorbent present in step (c) may be selected from silica-based adsorbents. Preferably the adsorbent is selected from a group consisting of alumina silicate, silica gel and mixtures thereof. In step (c) the amount of adsorbent is typically from 0.1 wt % to 10 wt %, preferably from 0.5 to 2.0 wt-%, of the total weight of the treated recycled or renewable organic material.

In step (c) the solid material created due to the heat treatment and/or adsorbent comprising undesired impurities may be removed. Removal of the solid material may be achieved for example by any separation method found suitable by a skilled person for separation of the solid material from the heat treated recycled or renewable organic material. Suitable examples include, but are not limited to, filtration, centrifugation, and phase separation. It is also to be understood that several separation methods, e.g. filtration and centrifugation, may be combined. Preferably the removal is accomplished by filtration. The removal is preferably performed at any temperature from 100 to 180° C.

Removal or solids/precipitates avoids deactivation of the hydrotreating catalyst in hydrotreatment of the recycled or renewable organic material.

In particular when adsorbent is present in step (c), it is advantageously removed. Thus optionally after the heat treatment the adsorbent comprising the undesired impurities is removed. Accordingly in step (c) the recycled or renewable organic material is subjected to removal of the solid adsorbent material.

Removal of the solid material may be achieved for example by any separation method found suitable by a skilled person for separation of the solid material from the heat treated recycled or renewable organic material. Suitable examples include, but are not limited to, filtration, centrifugation, and phase separation. It is also to be understood that several separation methods, e.g. filtration and centrifugation, may be combined. The removal is preferably performed at any temperature from 100 to 180° C.

Optionally, the process can be further enhanced by acid addition before or after heat treatment in step (c). This removes any remaining sodium impurities. The acid is preferably selected from citric acid and phosphoric acid.

Further optionally in step (c) process may be enhanced by adding water to the material before or during the heat treatment process. In step (c) the water content in the feed, i.e. the recycled or renewable organic material may advantageously vary in from 500 to 5000 ppm. If the recycled or renewable organic material comprises more than 5000 ppm water, it may be removed from the feed before step (c) by any suitable means known to a skilled person for lowering the water content in the recycled or renewable organic material below 5000 ppm.

For example (c1) the recycled or renewable organic material provided in step (a), comprising more than 20 ppm Cl, may be heated in the presence of an aqueous solution of alkaline metal hydroxide at a temperature from 100 to 450° C. to obtain the purified recycled or renewable organic material comprising (iii) less than 50% of the original chlorine content of the recycled or renewable organic material provided in step (a).

In step (c1) the recycled or renewable organic material is heated to cause thermal reactions that degrade chloride containing impurities, in particular chlorinated organic hydrocarbons. The heat treatment of step (c1) takes place at any temperature from 100 to 450° C. For achieving optimal results, step (c1) is performed at from 150 to 400° C., preferably at from 200 to 300° C.

For (c1) the time during which the recycled or renewable organic material is heated and held at the desired temperature, i.e. residence time, is typically from 1 to 180 min, preferably from 2 to 90 min, more preferably from 5 to 60 min in step (c1).

The alkaline metal hydroxide is typically selected from a group consisting of KOH, LiOH, NaOH and mixtures thereof. The alkaline metal hydroxide is preferably NaOH. The concentration of the aqueous alkaline metal hydroxide is typically from 0.1 to 10.0 mol/L. The ratio of the aqueous solution of alkaline metal hydroxide to the treated recycled or renewable organic material in step (c1) is typically more than 0.1 g/g, preferably from 0.5 to 1.5 g/g.

After heating the organic and aqueous fractions may be separated by any suitable method known to a skilled person to obtain the purified recycled or renewable organic material comprising less than 50% of the chlorine content of the recycled or renewable organic material provided in step (a).

Alternatively step (c) is accomplished by (c2) heat treating the recycled or renewable organic material at a temperature between 250 to 450° C., preferably from 350 to 450° C., to obtain heat treated the recycled or renewable organic material.

Further alternatively step (c) is accomplished by (c3) heat treating recycled or renewable organic material, preferably at 180 to 325° C., to form a heat treated recycled or renewable organic material, wherein the at least part of silicon compounds present in the recycled or renewable organic material are converted to volatile silicon compounds.

In (c3) the recycled or renewable organic material is heated to cause thermal reactions that disrupt silicon containing impurities comprised in the recycled or renewable organic material creating volatile silicon compounds material that can be subsequently removed from the heat treated recycled or renewable organic material. In particular polydimethylsiloxanes (PDMS) resulting from antifouling agents degrade to volatile polydimethylcyclosiloxanes (PDMCS) under the process conditions.

The heat treatment of step (c3) typically takes place at any temperature from 180 to 325° C. For achieving optimal results, step (c3) is performed at 200 to 300° C., preferably at 240 to 280° C.

The time during which the recycled or renewable organic material is heated and held at the desired temperature, i.e. residence time, is typically from 1 to 300 min, preferably from 5 to 90 min, more preferably from 20 to 40 min in step (c3).

The pressure in the heat treatment in step (c3) is typically from 500 to 5000 kPa, preferably from 800 to 2000 kPa.

The pressure range in step (c3) is dictated by volatility of water and it is advantageous to keep the heat treatment pressure slightly higher than the balance pressure of water boiling in particular heat treatment temperature. Too low pressure may drive volatile components like water and fractions of fatty acids into gas phase. Carry over of organic volatiles is enhanced by presence of water or stripping.

An applicable step (c3) preferably provides purified recycled or renewable organic material advantageously comprising (i) less silicon than the recycled or renewable organic material provided in step (a), preferably less than 10%, more preferably less than 5%, even more preferably less than 1%, of the original silicon content of the recycled or renewable organic material provided in step (a).

In yet further example step (c) is accomplished by (c4) heating the recycled or renewable organic material at any temperature from 180 to 325° C. in presence of an adsorbent. For achieving optimal results, step (c4) is performed at 200 to 300° C., preferably at 240 to 280° C.

The time during which the recycled or renewable organic material is heated and held at the desired temperature, i.e. residence time, is typically from 1 to 300 min, preferably from 5 to 240 min, more preferably from 30 to 90 min in step (c4).

In step (c4) the recycled or renewable organic material is heated to cause thermal reactions that disrupt the structure of the impurity containing compounds comprised in the recycled or renewable organic material thus forming material that adsorbs into the adsorbent present in the heating step (c), or material that forms solid precipitates and that can thus be subsequently removed from the recycled or renewable organic material.

The adsorbent present in step (c4) may be selected from silica-based adsorbents. Preferably the adsorbent is selected from a group consisting of alumina silicate, silica gel and mixtures thereof. In step (d4) the amount of adsorbent is typically from 0.1 to 10.0 wt-%, preferably 0.5 to 2.0 wt %, of the total weight of the treated recycled or renewable organic material.

An applicable step (c4) preferably provides purified recycled or renewable organic material comprising (ii) less than 30% of the original phosphorous content of the recycled or renewable organic material provided in step (a)

After the heat treatment in step (c) the volatiles created due to the heat treatment and/or otherwise present in the heat treated recycled or renewable organic material may be removed. Accordingly in optional step (d) the heat treated recycled or renewable organic material is subjected to evaporation of the volatile silicon compounds from the heat treated recycled or renewable organic material in one or more stages. In step (d) the evaporation is advantageously achieved at any temperature from 145 to 250° C., in particular at from 150° C. to 225° C. For achieving optimal results, the evaporation in step (d) is performed at from 160° C. to 200° C., preferably at from 160 to 180° C.

The reduced pressure in step (d) is such that evaporation of volatile Si compounds is achieved. Typically the pressure is from 0.1 to 5 kPa, preferably from 0.1 to 3 kPa.

The evaporated mass should be arranged to evaporation of 1 to 10 wt %, preferably from 1 to 8 wt %, more preferably from 1 to 5 wt %, even more preferably from 1 to 3 wt %, of the heat treated recycled or renewable organic material.

Furthermore, it is preferable to add water to the initial mixture of the heat treated recycled or renewable organic material. Adding a small percentage of water to the initial heat treated recycled or renewable organic material allows use of lower temperature and higher vacuum pressure while achieving the same level of Si removal than in normal evaporation. Even more importantly, there is less loss of volatile fatty acids, which reduces the amount of fatty acid waste to half compared to evaporation without water.

Accordingly in an example of the present invention water is added to the heat treated recycled or renewable organic material so that water content before evaporation step (d) is from 1 to 5 wt %, preferably from 1.5 to 4 wt % more preferably from 2 to 3 wt % of the total weight of the heat treated recycled or renewable organic material.

An applicable step (d) provides a vapor fraction comprising the major part of volatile silicon compounds, and a heat treated recycled or renewable organic material fraction comprising less than 50%, preferably less than 30%, of the original silicon content of the recycled or renewable organic material provided in step (a).

The evaporation in step (d) may be accomplished by any evaporation method found suitable by a skilled person for separation of the volatiles from the heat treated recycled or renewable organic material. Suitable examples include, but are not limited to, falling film evaporation, rising film evaporation, thin film evaporation and flash evaporation, for example. The evaporation may be accomplished in one or more stages. It is also to be understood that several evaporation methods, e.g. thin film evaporation and flash evaporation, may be combined. Preferable evaporation method of the present invention is one or multi stage flash evaporation. Due to high pressure difference in flash vessel, less evaporation mass is needed in flash evaporation to provide better mass transfer as compared to thin film evaporation. For example, applying the same method and equipment as in a typical crude tall oil (CTO) thin film evaporation process for tall oil pitch (TOP) after heat treatment remarkably increases heat consumption as compared to flash evaporation.

The optimum temperature, pressure, evaporated mass and how many flash stages to use depends on composition and quality of the recycled or renewable organic material and also on the heat treatment parameters (temperature, pressure and residence time) of step (c).

After desirable heat treatment and optionally evaporation of volatile silicon compounds is achieved the heat treated recycled or renewable organic material may be subjected to further purification by thermal cracking.

In optional step (e) the recycled or renewable organic material is heated to cause thermal cracking of the recycled or renewable organic material disrupting phosphorus compounds comprised in the recycled or renewable organic material creating a solid material that can be subsequently removed from the heat treated recycled or renewable organic material e.g. by filtration.

The thermal cracking of step (b) may be performed in a separate reactor unit or in hydrotreating reactor before catalyst bed at a guard bed.

Accordingly in step (e) the recycled or renewable organic material is thermally cracked thereby reducing the oxygen content of the recycled or renewable organic material and phosphorous content of the recycled or renewable organic material.

The thermal cracking of step (e) typically takes place at any temperature from 350 to 450° C.

The thermal cracking of step (e) takes place in an apparatus enabling sufficient residence time. The time during which the recycled or renewable organic material is heated and held at the desired temperature, i.e. residence time, is typically from 1 to 300 min, preferably from 5 to 240 min, more preferably from 30 to 90 min in step (e).

The pressure in step (e) is such that sufficient oxygen removal is achieved. Typically the pressure in step (e) is from 4 to 20 MPa, preferably from 8 to 16 MPa.

After the thermal cracking in step (e) the volatiles created due to the thermal cracking and/or otherwise present in the recycled or renewable organic material may be removed. Accordingly in step (e) the thermally cracked recycled or renewable organic material is optionally subjected to removing volatiles from the thermally cracked recycled or renewable organic material. This can be achieved in one or more stages. Typical examples of the volatiles include CO and $CO_2$.

Removal of the volatiles may be achieved for example by any separation method found suitable by a skilled person for separation of the volatiles from the thermally cracked recycled or renewable organic material. Suitable examples include, but are not limited to, evaporation, in particular flash evaporation and thin film evaporation.

The optimum temperature, pressure, evaporated mass and how many flash stages to use depends on composition and quality of the recycled or renewable organic material and also on the thermal cracking parameters (temperature, pressure and residence time) of step (e).

The temperature and pressure in step removal of volatiles in step (e) is such that evaporation of volatile oxygen compounds is achieved. In step (e) the removal of volatiles is typically achieved at any temperature from 300 to 450° C. For achieving optimal results, removing of volatiles in step (e) is performed at from 350° C. to 450° C. Typically the pressure in removing volatiles in step (e) is from 0.1 to 5 kPa, preferably from 0.1 to 3 kPa.

Removal of volatiles reduces the amount of oxygen in the recycled or renewable organic material.

After the thermal cracking in step (e) the solid material created due to the thermal cracking may be removed. Accordingly in step (e) the thermally cracked recycled or renewable organic material is optionally subjected to removing solids/precipitates from the thermally cracked recycled or renewable organic material.

Removal of the solid material may be achieved for example by any separation method found suitable by a skilled person for separation of the solid material from the thermally cracked recycled or renewable organic material. Suitable examples include, but are not limited to, filtration, centrifugation, bleaching, degumming and phase separation. It is also to be understood that several separation methods, e.g. filtration and centrifugation, may be combined. Preferably the removal is accomplished by filtration. The removal of is preferably performed at any temperature from 100 to 180° C.

Removal or solids/precipitates, in particular those comprising phosphorous, avoids deactivation of the hydrotreating catalyst in hydrotreatment of the recycled or renewable organic material.

An applicable step (e) preferably provides purified recycled or renewable organic material comprising (iv) less than 30% of the original phosphorous content of the recycled or renewable organic material provided in step (a).

After the step (c) the purified recycled or renewable organic material is subjected to (f) to hydrotreatment to further remove Cl from the recycled or renewable organic material.

The term "hydrotreating" refers to a chemical engineer process in which reaction of hydrogen is used to remove impurities, such as oxygen, sulfur, nitrogen, phosphorous, silicon and metals, especially as part of oil refining.

Hydrotreating can be performed in one or several steps in one or more reactor units or catalyst beds.

Step (f) is typically achieved under continuous hydrogen flow. For achieving optimal results the continuous hydrogen flow is step (f) preferably has H2/feed ratio from 500 to 2000 n-L/L, more preferably from 800 to 1400 n-L/L.

In step (f) hydrotreatment is advantageously performed at a temperature from 270 to 380° C., preferably from 275 to 350° C., more preferably from 300 to 330° C. Typically the pressure in step (f) is from 4 to 20 MPa.

The hydrotreating catalyst is step (f) preferably comprises at least one component selected from IUPAC group 6, 8 or 10 of the Periodic Table. Preferably the hydrotreating catalyst in step (f) is a supported Pd, Pt, Ni, NiW, NiMo or a CoMo catalysts and the support is zeolite, zeolite-alumina, alumina and/or silica, preferably NiMo/Al$_2$O$_3$ or CoMo/Al$_2$O$_3$. In particular the hydrotreating catalyst is a sulfided NiW, NiMO or CoMo catalyst.

The time during which the recycled or renewable organic material is heated and held at the desired temperature, i.e. residence time, is typically from 1 to 300 min, preferably from 5 to 240 min, more preferably from 30 to 90 min in step (e).

An applicable hydrotreatment step (f) provides a purified hydrotreated recycled or renewable organic material, wherein the purified hydrotreated recycled or renewable organic material comprises (i) less than 10%, preferably less than 5%, more preferably less than 1%, of the original silicon content of the recycled or renewable organic material provided in step (a) and/or (ii) less than 30% of the original phosphorous content of the recycled or renewable organic material provided in step (a) and/or (iii) less than 20 ppm chlorine or less than 50% of the chlorine content of the recycled or renewable organic material provided in step (a) and/or (iv) less than 30% of the original phosphorous content of the recycled or renewable organic material provided in step (a).

In a particular example step (f) is accomplished by (f1) hydrodeoxygenating (HDO) the heat treated recycled or renewable organic material fraction. This is preferably achieved in a presence of a HDO catalyst at a temperature from 270 to 380° C. under pressure from 4 to 20 MPa and under continuous hydrogen flow. Preferably step (f1) is performed to obtain purified recycled or renewable organic material comprising less than 1 wt % oxygen.

The term "hydrodeoxygenation (HDO)" refers to removal of oxygen as water by the means of molecular hydrogen under the influence of a (HDO) catalyst.

The HDO catalyst may for example be selected from a group consisting of NiMO-, CoMo-, NiW-catalysts and any mixtures thereof. Preferably the HDO catalyst in step (f) is sulfided NiW, sulfided NiMo or sulphided NiMO-catalyst.

Advantageously, the continuous hydrogen flow has H2/feed ratio from 500 to 2000 n-L/L, preferably from 800 to 1400 n-L/L.

For achieving optimal results part of the deoxygenated recycled or renewable organic material may be recycled in step (f1). Preferably the ratio of the fresh feed i.e. purified recycled or renewable organic material obtained in step (f1) to the recycled deoxygenated recycled or renewable organic material is from 2:1 to 20:1.

When step (f) is accomplished by (f1) hydrodeoxygenating (HDO) the heat treated recycled or renewable organic material fraction in a presence of a HDO catalyst at a temperature from 290 to 350° C. under pressure from 4 to 20 MPa and under continuous hydrogen flow preferably purified recycled or renewable organic material comprising less than 1 wt % of oxygen and/or less than 20%, preferably less than 10%, more preferably less than 5%, of the original silicon content of the recycled or renewable organic material provided in step (a) and/or less than 30% of the original phosphorous content of the recycled or renewable organic material provided in step (a) and/or less than 50% of the chlorine content of the recycled or renewable organic material provided in step (a) is obtained.

In another example step (d) is accomplished by (d2) hydrodesulfurizing (HSD) the heat treated recycled or renewable organic material fraction. The term "hydrodesulfurisation (HDS)" refers to removal of sulfur as hydrogensulfide by the means of molecular hydrogen under the influence of a (HDS) catalyst.

In another example step (d) is accomplished by (d3) hydrometaillizing (HDM) the heat treated recycled or renewable organic material fraction. The term "hydrodemetallization (HDM)" refers to removal of metals by trapping them with a (HDM) catalyst.

In another example step (d) is accomplished by (d4) hydrodenitrificating (HDN) the heat treated recycled or renewable organic material fraction. The term "hydrodenitrification (HDN)" refers to removal of nitrogen by the means of molecular hydrogen under the influence of a (HDN) catalyst.

In another example step (d) is accomplished by (d5) hydrodesarommatizing (HDA) the heat treated recycled or renewable organic material fraction. The term "hydrodearomatisation (HDA)" refers to saturation or ring opening of aromatics by the means of molecular hydrogen under the influence of a (HDA) catalyst.

Figure 1:
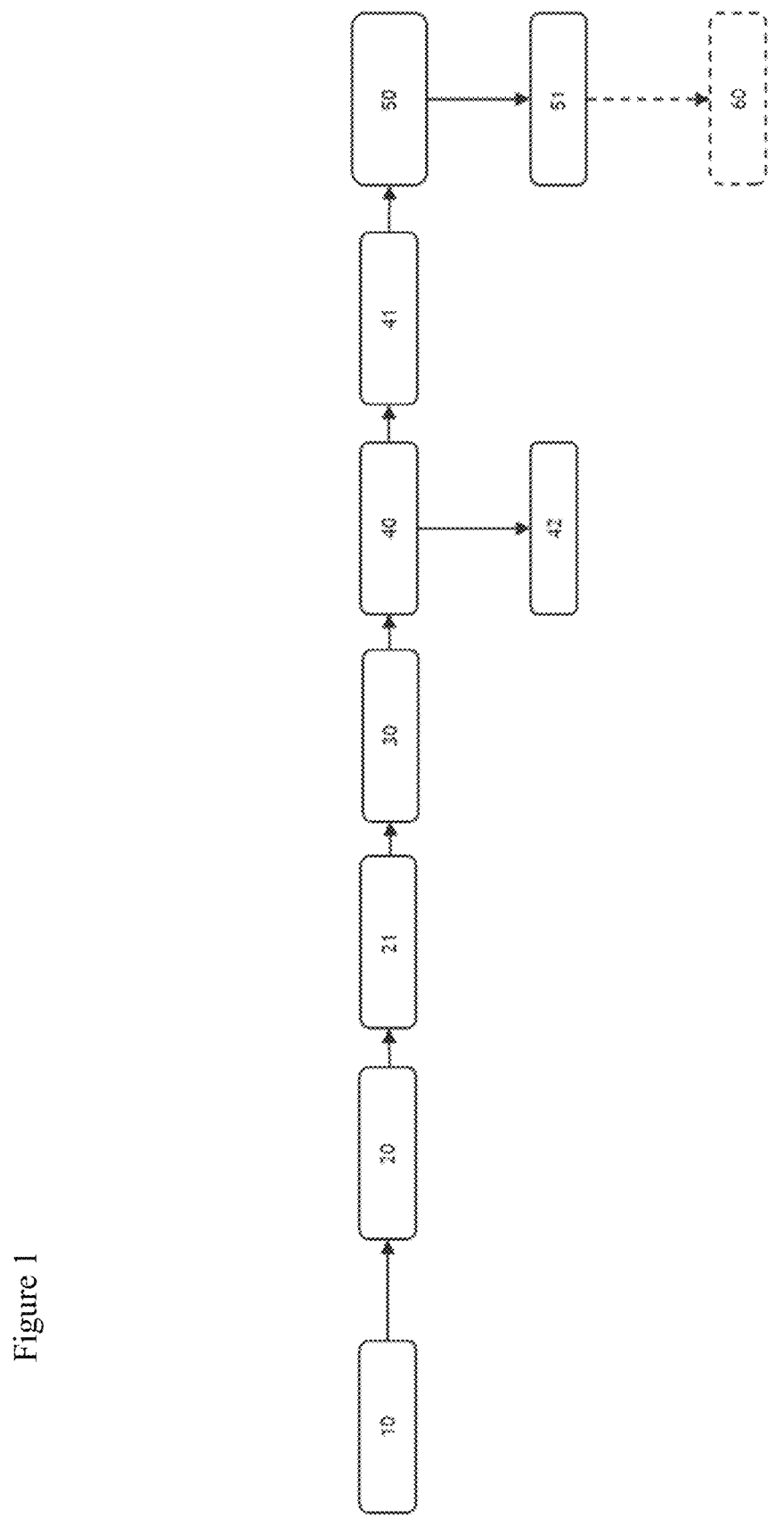

FIG. 1 illustrates a first exemplary process flow of the present method.

Referring to FIG. 1, a feed of recycled or renewable organic material, in particular tall oil pitch (TOP), 10 is subjected to a step of pre heat treating 20 the recycled or renewable organic material as discussed herein for step (b) to obtain a heat treated recycled or renewable organic material fraction 21 renewable organic material. The pre heat treated recycled organic material 21 is then subjected to heating 30 the recycled or renewable organic material the presence of adsorbent to adsorb the impurities to the adsorbent and to render the mixture separable as discussed herein for step (c). The adsorbent is then separated 40 from the treated feed of recycled or renewable organic material as discussed herein for step (c) to obtain a purified recycled or renewable organic material 41 and an adsorbent 42 comprising the major part of the impurities. The purified recycled or renewable organic material is then hydrotreated 50, as discussed herein for step (f) to obtain a purified hydrotreated recycled or renewable organic material 51, wherein the purified hydrotreated recycled or renewable organic material comprises less than 50% of the impurity content of the recycled or renewable organic material provided in step (a). The purified hydrotreated recycled or renewable organic material 51 may then be subjected to catalytic upgrading 60.

FIG. 2 illustrates a first exemplary process flow of the present method.

Referring to FIG. 2, a feed of recycled or renewable organic material, in particular tall oil pitch (TOP), 10 is subjected to a step of pre heat treating 20 the recycled or renewable organic material as discussed herein for step (b) to obtain a heat treated recycled or renewable organic material fraction 21 comprising less than 50% of the impurity content of the recycled or renewable organic material provided in step (a). The pre heat treated recycled organic material 21 is then subjected to a step of heat treating 35 the recycled or renewable organic material as discussed herein for step (c). The heat treated feed of recycled or renewable organic material is then evaporated 45 as discussed herein for step (c) and a bottom containing a heat treated recycled or renewable organic material fraction 46 comprising less than 30% of the original silicon content of the recycled or renewable organic material provided in step (a), and a vapor fraction 47 comprising the major part of volatile silicon compounds is obtained. The purified recycled or renewable organic material is then hydrodeoxygenated 50, as discussed herein for step (d) to obtain a purified deoxygenated recycled or renewable organic material 51, wherein the purified deoxygenated recycled or renewable organic material. The deoxygenated recycled or renewable organic material 51 may then be subjected to catalytic upgrading 60.

After the recycled or renewable organic material has been purified in accordance with the present method, it may be subjected to further processing e.g. catalytic upgrading. Such catalytic upgrading processes include, but are not limited to, catalytic cracking, catalytic hydrocracking thermo-catalytic cracking catalytic hydrotreatment, fluid catalytic cracking catalytic ketonization, and catalytic esterification. Such processes require the recycled or renewable organic material to be sufficiently pure and free from impurities that may otherwise hamper the catalytic process or poison the catalyst(s) present in the process.

Accordingly the present invention further provides a process for producing recycled or renewable hydrocarbons, comprising steps of (x) purifying the recycled or renewable organic material as discussed herein, and (y) subjecting the purified recycled or renewable organic material to an oil refinery conversion process, wherein the oil refinery conversion process comprises altering the molecular weight of the feed, such hydrocracking, or steamcracking, removal of heteroatoms from the feed, such as thermal catalytic cracking, fluid catalytic cracking or hydrotreating in particular hydrodeoxygenating or hydrodesulfurizing, altering the degree of saturation of the feed, such as hydrotreating, thermal catalytic cracking or fluid catalytic cracking rearranging the molecular structure of the feed, such as isomerizing, or any combination thereof to obtain at least one recycled or renewable hydrocarbon.

In a typical example of the present process the recycled or renewable hydrocarbon is a renewable traffic fuel or fuel component.

In an example of the present process, step (y) is hydrocracking. In such example, step (y) is preferably performed in a mild hydrocracking (MHC) refinery unit, in particular in a presence of a hydrocracking catalyst.

In another example of the present process, step (y) is steamcracking.

In such example step (y) is preferably performed in a steamcracking unit.

In yet another example of the present process, step (y) is isomerization. In such example, step (y) is preferably performed in an isomerization unit.

In yet another example of the present process, step (y) is hydrotreating. In such example, step (y) is preferably performed in a hydrotreating unit.

In yet another example of the present process, step (y) is thermal catalytic cracking (TCC). In such example, step (y) is preferably performed in a thermal catalytic cracking unit.

In yet another example of the present process, step (y) is fluid catalytic cracking (FCC). In such example, step (y) is preferably performed in a fluid catalytic cracking unit.

EXAMPLES

Example 1

Crude and heat treated tall oil pitch (TOP) were subjected to distillation under varied conditions. Yield and silicon content of obtained distillate and bottom fractions are shown in Table 1 (reference) for crude TOP and in Table 2 for heat treated TOP.

TABLE 1

| | | Crude TOP | | |
|---|---|---|---|---|
| | p (kPa) | T (° C.) | Distillate | Bottom |
| Conditions | 0.1 | 147 | | |
| Yield | | | 4% | 96% |
| Si/ppm | | | 100 | 35 |
| Conditions | 1 | 194 | | |
| Yield | | | 6% | 94% |
| Si/ppm | | | 230 | 35 |
| Conditions | 3 | 222 | | |
| Yield | | | 6% | 94% |
| Si/ppm | | | 260 | 37 |
| Conditions | 5 | 236 | | |
| Yield | | | 5% | 95% |
| Si/ppm | | | 280 | 36 |

(Si = 54 ppm)

TABLE 2

| | | Heat-treated TOP | | |
|---|---|---|---|---|
| | p (kPa) | T (° C.) | Distillate | Bottom |
| Conditions | 0.1 | 145 | | |
| Yield | | | 4% | 96% |
| Si/ppm | | | 160 | 8 |
| Conditions | 1 | 193 | | |
| Yield | | | 3% | 97% |
| Si/ppm | | | 260 | 10 |
| Conditions | 3 | 220 | | |
| Yield | | | 5% | 95% |
| Si/ppm | | | 440 | 11 |
| Conditions | 5 | 235 | | |
| Yield | | | 5% | 95% |
| Si/ppm | | | 360 | 14 |

(Si = 25 ppm)

As can be seen from Table 1 and 2, silicon content in bottom fraction of heat-treated TOP is significantly lower than crude TOP's.

Example 2

Six tall oil pitch qualities were flash evaporated without water and with water (3%). Process conditions are shown in Table 3 (without water) and Table 4 (with water).

TABLE 3

Process conditions for the evaporation

| Flash conditions | TOP1 | TOP2 | TOP4 | TOP5 | TOP6 | TOPMIX |
|---|---|---|---|---|---|---|
| T run (° C.) | 172 | 184 | 190 | 228 | 218 | 190 |
| P (kPa) | 1 | 1 | 1 | 1 | 1 | 1 |
| wt % (bottom) | 93.9 | 91.5 | 93.3 | 93.7 | 93 | 93.5 |
| wt % (heads) | 6.1 | 8.5 | 6.7 | 6.3 | 7 | 6.5 |
| wt % of fatty acids (heads) | 5.5 | 6.8 | 6.2 | 5.9 | 6.8 | 6 |

TABLE 4

Process conditions for the evaporation with water addition

| Flash conditions | TOP1 | TOP2 | TOP4 | TOP5 | TOP6 | TOPMIX |
|---|---|---|---|---|---|---|
| Water added (%) | 3 | 3 | 3 | 3 | 3 | 3 |
| T run (° C.) | 160 | 160 | 160 | 160 | 160 | 160 |
| P (mbar) | 50 | 50 | 50 | 50 | 50 | 50 |
| w % (bottom) | 94.3 | 93.8 | 93.6 | 94.6 | 95.5 | 95.4 |
| w % (heads) | 5.7 | 6.2 | 6.4 | 5.4 | 4.5 | 4.6 |
| w % of fatty acids (heads) | 1.8 | 2.3 | 2.5 | 1.1 | 0.9 | 1 |

TABLE 5

Silicon contents after heat treatment (HT) and flash evaporation

| Silicon content, ppm | TOP1 | TOP2 | TOP4 | TOP5 | TOP6 | TOPMIX |
|---|---|---|---|---|---|---|
| After HT (Feed) | 75 | 76 | 190 | 350 | 26 | 140 |
| After Flash (without added water) | 18 | 26 | 32 | 96 | 8.5 | 35 |
| After Flash (3 wt % water added) | 15 | 27 | 32 | 100 | 8.6 | 34 |

The average Si-removal efficiency of the flash evaporation for both with and without water addition was 73% on average for all the 6 TOP qualities tested (Table 5). Even more importantly, there is less loss of volatile fatty acids, which reduces the amount of fatty acid waste to half compared to flashing without water (Table 4).

Example 3

Heat treated and flash evaporated TOP samples were hydrotreated (hydrodeoxygenated) in different temperatures. Other process conditions, pressure and weight hourly space velocity (WHSV), were kept constant. Pressure was 5000 kPa and WHSV was 0.95 1/h.

TABLE 6

Silicon contents of heat treated and flash evaporated TOP before and after HDO

| Silicon content, ppm | T = 291° C. | T = 320° C. | T = 333° C. | T = 350° C. |
|---|---|---|---|---|
| After HT and flash (Feed) | 43 | 43 | 43 | 43 |
| After HDO | 4 | 3.8 | 1.5 | 0.6 |

The Si-removal efficiency of the hydrotreatment for heat treated and flash evaporated TOP increases when temperature is increased (Table 6).

Example 4

High Temperature NaOH Treatment of Waste Plastic Pyrolysis Oil

The following experiment was carried out in a 1-litre batch autoclave reactor. The waste plastic pyrolysis oil (340 g) and the 2 wt-% aqueous NaOH (227 g) were weighed together into the reactor vessel. After sealing and pressure testing, the reactor that was stirred at 500 rpm was heated to the desired reaction temperature of 240° C., which was then maintained for 30 min. The reactor was subsequently cooled down to room temperature before recovery of products. The contents were decanted from the reactor vessel into centrifugation tubes, and the liquids were centrifuged at 20° C. and 4300 rpm for 30 minutes. After the centrifugation, the purified pyrolysis oil was recovered as a separate layer, and analysed for its Cl, Br, S and N content. Cl, Br and S content was determined using X-ray fluorescence spectroscopy, and N content was determined according to standard ASTMD5762. The results, which are presented in Table 7, clearly show that the content of both Cl and Br decrease by more than 60%.

TABLE 7

Impurity content of waste plastic pyrolysis oil before and after 30 min treatment with 2 wt-% aqueous sodium hydroxide at 240° C.

|  | Original waste plastic pyrolysis oil | Purified waste plastic pyrolysis oil #1 | Decrease (%) |
|---|---|---|---|
| N (mg/kg) | 770 | 360 | 53 |
| Cl (mg/kg) | 625 | 187 | 70 |
| Br (mg/kg) | 307 | 111 | 64 |
| S (mg/kg) | 1000 | 911 | 9 |

Example 5

Crude TOP was treated in the presence of two adsorbents: alumina silicate (Tonsil 9194 FF) and silica gel (Trisyl). The amount of each adsorbent was 1.5 wt-%. Crude TOP samples from different producers were tested. Water addition of 0.4 wt.-% was made prior the high temperature adsorption treatment.

During high temperature adsorption treatment the sample materials were heated to temperature 280° C. for 60 minutes. After this treatment the sample materials were cooled to 100° C. and filtered through a 0.45 μm filter paper.

Figure 3:
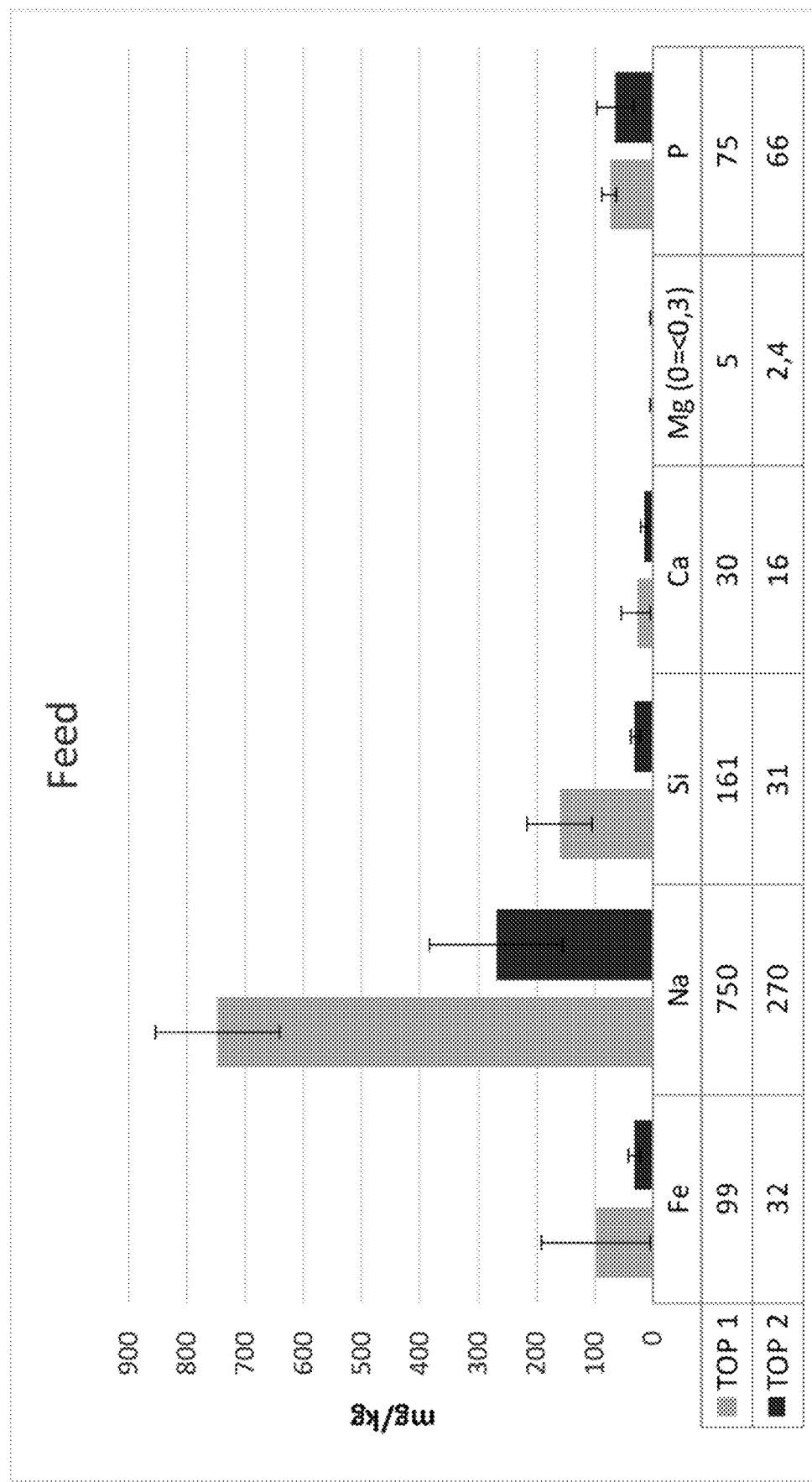
FIG. 3 illustrates effect of acid treatment on Si and P removal from crude TOP samples.
Figure 4:
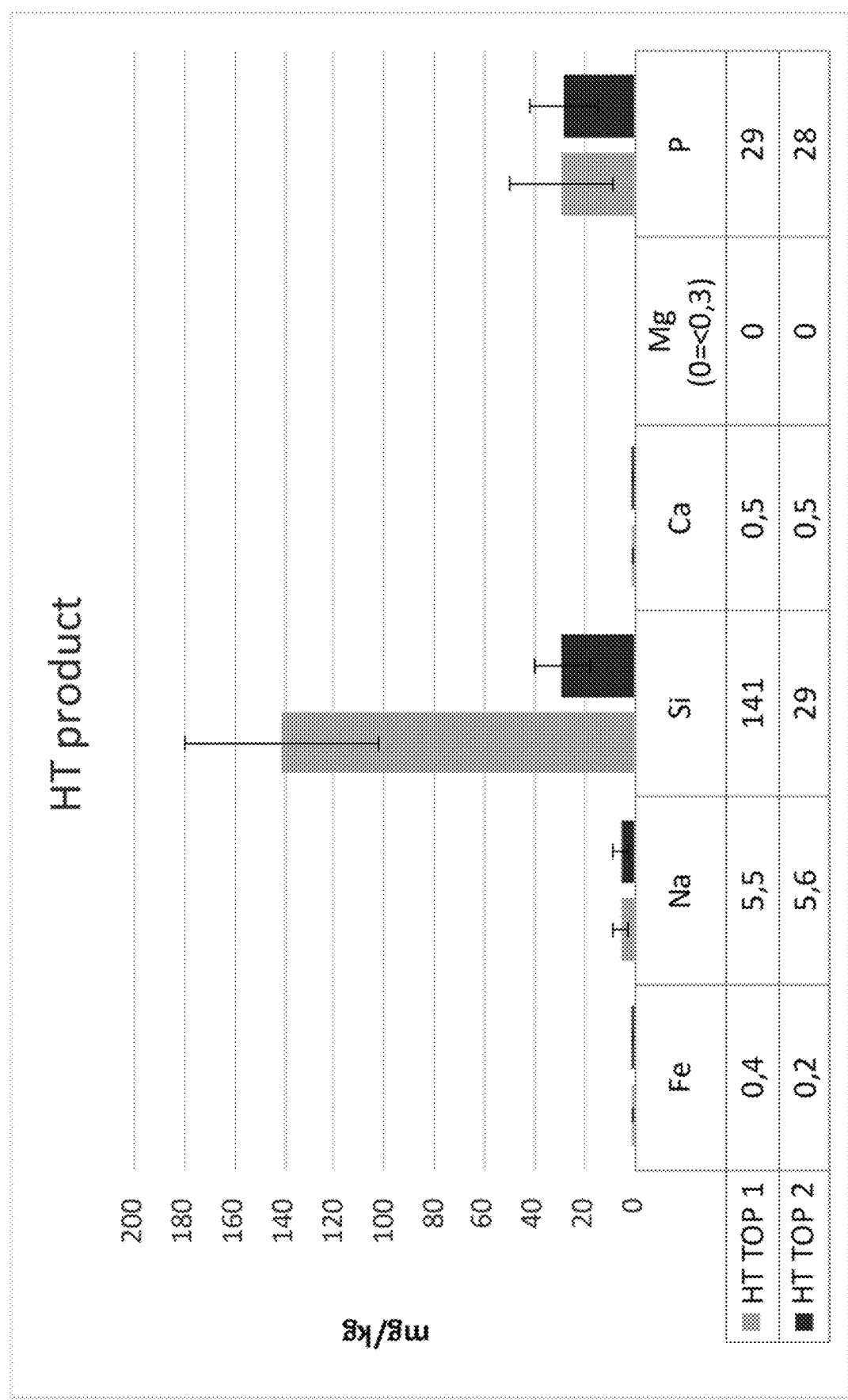
FIG. 4 illustrates effect of heat treatment on Si and P removal from crude TOP samples.

From the obtained results it can be seen that Si and other impurities can be very efficiently removed from the feed at elevated temperatures in presence of both alumina silicate and silica gel adsorbent. However, more efficient purification was obtained using silica gel material. The results are listed in Table 8. As can be seen from Table 9 and FIG. 3 and FIG. 4, efficient Si and P removal cannot be achieved by mere acid+heat treatment nor acid+adsorption purification method.

TABLE 8

Effect of heat treatment adsorption on Si and P removal from different types of crude TOP samples. Adsorbent addition 1.5 wt-%.

| | | 14144865<br>Crude<br>TOP A | 14225369<br>280° C., 1 hour<br>1.5 wt.-% Tonsil 9194 | 14225368<br>280° C., 1 hour<br>1.5 wt.-% Trisyl |
|---|---|---|---|---|
| Al | mg/kg | 7.1 | 3.7 | <0.2 |
| Fe | mg/kg | 27 | 32 | 2.4 |
| Na | mg/kg | 580 | 150 | 150 |
| Si | mg/kg | 27 | 3 | 1.3 |
| Ca | mg/kg | 56 | 13 | 0.82 |
| Mg | mg/kg | 6.2 | 14 | <0.3 |
| P | mg/kg | 50 | 14 | <0.6 |
| | | 14177357<br>Crude<br>TOP B | 14225371<br>280° C., 1 hour<br>1.5 wt.-% Tonsil 9194 | 14225370<br>280° C.<br>1.5 wt.-% Trisyl |
| Al | mg/kg | 10 | 4 | <0.2 |
| Fe | mg/kg | 71 | 50 | 0.62 |
| Na | mg/kg | 740 | 180 | 170 |
| Si | mg/kg | 130 | 12 | 4.4 |
| Ca | mg/kg | 41 | 13 | 0.57 |
| Mg | mg/kg | 7.4 | 13 | <0.3 |
| P | mg/kg | 137 | 21 | 1.3 |

TABLE 9

Effect of acid treatment (Citric acid addition 2000 ppm) and adsorption on Si and P removal from crude TOP sample. Adsorbent addition 2.0 wt-%.

| | | 14151662<br>Crude TOP C | 14151646<br>120° C. bleaching +<br>cake filtration<br>2 wt.-% Tonsil 9194 |
|---|---|---|---|
| Al | mg/kg | 5 | 0.64 |
| Fe | mg/kg | 29 | 1.1 |
| Na | mg/kg | 490 | 6.9 |
| Si | mg/kg | 41 | 15 |
| Ca | mg/kg | 25 | 4.5 |
| Mg | mg/kg | 4.2 | 1.5 |
| P | mg/kg | 73 | 9.5 |

It will be obvious to a person skilled in the art that, as the technology advances, the inventive concept can be implemented in various ways. The invention and its embodiments are not limited to the examples described above but may vary within the scope of the claims.

The invention claimed is:

1. A method of purifying a recycled or renewable organic material, wherein the recycled or renewable organic material contains at least impurities of silicon compounds and phosphorous compounds, the method comprising:
   (a) providing the recycled or renewable organic material;
   (b) optionally pre heat treating the recycled or renewable organic material at 180 to 325° C., and optionally adding acid before or after the pre heat treatment process, and optionally filtering the pre heat treated recycled or renewable organic material after the pre heat treatment;
   (c) heat treating the recycled or renewable organic material at 100 to 450° C. at a pressure from 500 to 5000 kPa, optionally in a presence of an adsorbent, optionally adding water before or during the heat treatment process, and optionally adding acid before or after the heat treatment process, and optionally filtering the heat treated recycled or renewable organic material after the heat treatment;
   (d) evaporating volatile silicon compounds from the heat treated recycled or renewable organic material compounds thereby reducing the silicon content of the heat treated recycled or renewable organic material;
   (e) optionally thermally cracking the recycled or renewable organic material thereby reducing oxygen and phosphorous content of the heat treated recycled or renewable organic material, and optionally removing volatiles from the thermally cracked recycled or renewable organic material, and optionally removing solids/precipitates from the recycled or renewable organic material; and
   (f) hydrotreating the heat treated recycled or renewable organic material in a presence of a hydrotreating catalyst;
   to obtain a purified hydrotreated recycled or renewable organic material, which contains less than 30% of an original phosphorous content of the recycled or renewable organic material provided in step (a).

2. A method as claimed in claim 1, wherein step (c) is accomplished by (c2) heat treating the recycled or renewable organic material at a temperature between 250 to 450° C. to obtain heat treated the recycled or renewable organic material.

3. A method as claimed in claim 2, wherein step (c2) is performed at 350 to 450° C.

4. A method as claimed in claim 1, wherein step (c) is accomplished by (c3) heat treating the recycled or renewable organic material at 180 to 325° C. to form a heat treated recycled or renewable organic material, wherein the at least part of the silicon compounds present in the recycled or renewable organic material are converted to volatile silicon compounds.

5. A method as claimed in claim 4, wherein heat treatment in step (c3) is performed at 200 to 300° C.

6. A method as claimed in claim 5, wherein the residence time is from 1 to 300 min in heat treatment of step (c3).

7. A method as claimed in claim 6, wherein the method comprises:
   (d) evaporating volatile silicon compounds from the heat treated recycled or renewable organic material to obtain (i) a vapor fraction containing a major part of the volatile silicon compounds, and (ii) a heat treated recycled or renewable organic material fraction containing less silicon than the recycled or renewable organic material provided in step (a).

8. A method as claimed in claim 7, wherein evaporation in step (d) is performed at 150° C. to 225° C.

9. A method as claimed in claim 8, wherein the pressure in evaporation of step (d) is from 0.1 to 5 kPa.

10. A method as claimed in claim 9, wherein in evaporation of step (d) 1 to 10 wt % of the heat treated recycled or renewable organic material is evaporated.

11. A method as claimed in claim 10, wherein water is added to the heat treated recycled or renewable organic material so that a water content before evaporation step (d) is from 1 to 5 wt % of a total weight of the heat treated recycled or renewable organic material.

12. A method as claimed in claim 11, wherein the temperature in step (c) is from 180 to 325° C.

13. A method as claimed in claim 12, wherein the residence time is from 1 to 300 min in step (c).

14. A method as claimed in claim 1, wherein the adsorbent in step (c) is selected from silica-based adsorbents.

15. A method as claimed in claim 14, wherein an amount of adsorbent in step (c) is from 0.1 to 10.0 wt % of a total weight of the treated recycled or renewable organic material.

16. A method as claimed in claim 15, wherein acid is added before or after pre heat treatment in step (b).

17. A method as claimed in claim 16, wherein acid is added before or after heat treatment in step (c).

18. A method as claimed in claim 17, wherein after step (d) a silicon content of the heat treated recycled or renewable organic material fraction is less than 50% of an original silicon content of the recycled or renewable organic material provided in step (a).

19. A method as claimed in claim 18, wherein hydrotreating step (f) takes place under continuous hydrogen flow.

20. A method as claimed in claim 19, wherein in step (f) the continuous hydrogen flow has an H2/feed ratio from 500 to 2000 n-L/L.

21. A method as claimed in claim 20, wherein step (f) is performed at a temperature from 270 to 380° C.

22. A method as claimed in claim 21, wherein step (f) is performed under pressure from 4 to 20 MPa.

23. A method as claimed in claim 22, wherein the hydrotreating catalyst in step (f) contains at least one component selected from IUPAC group 6, 8 or 10 of the Periodic Table.

24. A method as claimed in claim 23, wherein the hydrotreating catalyst in step (f) is a supported Pd, Pt, Ni, NiW, NiMo or CoMo catalysts and the support is zeolite, zeolite-alumina, alumina and/or silica, $NiW/Al_2O_3$, $NiMo/Al_2O_3$ or $CoMo/Al_2O_3$.

25. A method as claimed in claim 24, wherein step (f) is accomplished by (f1) hydrodeoxygenating (HDO) the heat treated recycled or renewable organic material fraction.

26. A method as claimed in claim 25, wherein step (f) is accomplished by (f1) hydrodeoxygenating (HDO) the heat treated recycled or renewable organic material fraction in a presence of a HDO catalyst at a temperature from 290 to 350° C. under pressure from 4 to 20 MPa and under continuous hydrogen flow to obtain a purified recycled or renewable organic material containing less than 30% of an original phosphorous content of the recycled or renewable organic material provided in step (a).

27. A method as claimed in claim 26, wherein in step (f1) the HDO catalyst is sulfided NiW, NiMo or CoMo-catalyst.

28. A method as claimed in claim 27, wherein a part of the hydrotreated product is recycled in step (f).

29. A method as claimed in claim 28, wherein a ratio of the fresh feed to the hydrotreated product is from 2:1 to 20:1.

30. A method as claimed in claim 29, wherein the recycled or renewable organic material is selected from a group consisting of plant based fats and oils, animal based fats and oils, fossil waste-based oils, waste oils, algal oils and microbial oils.

31. A process for producing recycled or renewable hydrocarbons, the process comprising:
(x) purifying the recycled or renewable organic material as claimed in claim 30; and
(y) subjecting the purified recycled or renewable organic material to an oil refinery conversion process, wherein the oil refinery conversion process includes altering a molecular weight of the feed, removal of heteroatoms from the feed, altering a degree of saturation of the feed, rearranging the molecular structure of the feed, or any combination thereof to obtain at least one recycled or renewable hydrocarbon.

32. A process as claimed in claim 31, wherein step (y) is hydrocracking.

33. A process as claimed in claim 32, wherein step (y) is performed in a mild hydrocracking (WIC) refinery unit.

34. A process as claimed in claim 33, wherein step (y) is performed in a presence of a hydrocracking catalyst.

35. A process as claimed in claim 31, wherein step (y) is steamcracking.

36. A process as claimed in claim 31, wherein step (y) is isomerization.

37. A process as claimed in claim 31, wherein step (y) is hydrotreating.

38. A process as claimed in claim 31, wherein step (y) is thermal catalytic cracking.

39. A process as claimed in claim 31 wherein step (y) is fluid catalytic cracking.

* * * * *